May 22, 1934. E. A. GILOT 1,960,149
FOLDABLE CONTAINER FOR DISINFECTANT ODORANTS AND THE LIKE SUBSTANCES
Filed March 14, 1933
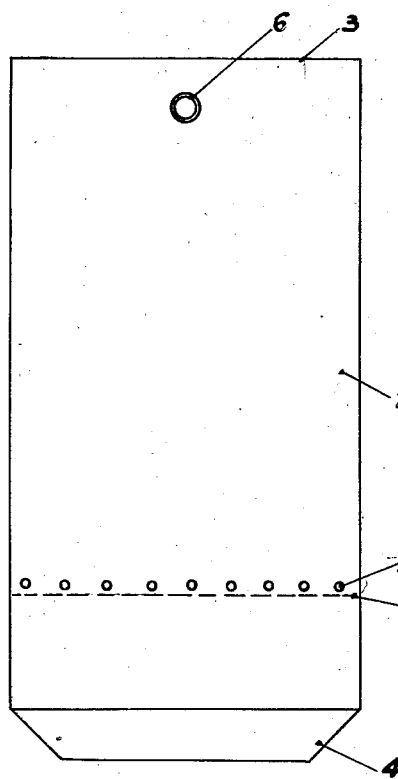
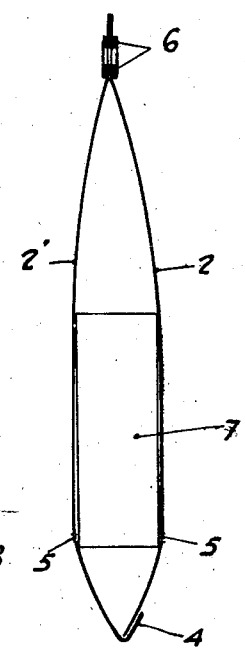
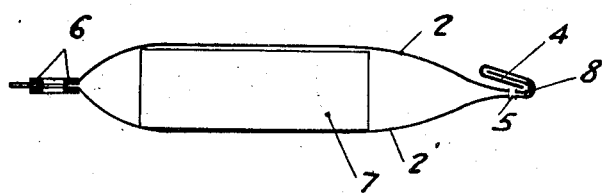

Patented May 22, 1934

1,960,149

UNITED STATES PATENT OFFICE 1,960,149

FOLDABLE CONTAINER FOR DISINFECTANT ODORANTS AND THE LIKE SUBSTANCES

Emile Armand Gilot, Paris, France, assignor to Société S. E. P., Paris, France, a corporation of France Application March 14, 1933, Serial No. 660,731
In France June 9, 1932

3 Claims. (Cl. 299—24)

The present invention has for its object a foldable container enclosing in a tight manner for instance for sale, certain volatile solid disinfectant, odorant and the like substances such as those used for destroying mites, while allowing the use of these same substances, the emanations of which are to be diffused in the surrounding atmosphere through mere unfolding of the container without it being necessary to remove the substances from the bag or the like container.

To this end the container, which is of paper, of waterproof cloth or of a suitable cellulosic or the like material is provided with apertures or perforations adapted to be closed through a folding of the material forming the bag.

Moreover the container is sufficiently deep for the solid volatile substance to be capable of occupying a plurality of positions, for one of which it does not face the apertures provided for evaporation, and for another of which it faces these apertures. Preferably the bag is arranged in a manner such that it assumes naturally, for use, a position such that the volatile substance falls through gravity into the second of these positions.

A form of execution of a bag executed according to the present invention has been described hereinbelow by way of example and illustrated in accompanying drawing.

Fig. 1 shows the bag lying flat.

Fig. 2 is a longitudinal axial cross-section of this bag containing a plate or tablets of the volatile substance, in the position used for sale.

Fig. 3 shows the bag in its position used for evaporation.

The bag comprises as usual two walls 2, 2' and a closed end 3. The other end is open to allow the introduction of the substance to be evaporated, but may be closed by a tongue 4 adapted to be folded over, and attached, for instance through gluing. At a certain distance from the tongue 4 is arranged a row of perforations 5 passing through the two walls 2, 2' for instance. Near the end 3 is an eye 6 for hanging the bag to a suitable support. The bag is used in the following manner.

After introducing into it the solid volatile substance which may be constituted for instance by one or more cakes or tablets 7 the said substance is caused to slip towards the closed end 3 and after closing the bag by gluing down the tongue 4, the bag is folded transversely, say for instance along the fold line 8 (Fig. 2) whereby the line of perforations 5 is covered by the fold and cannot allow any escape of vapours from the cakes 7. It is possible, if desired, to keep the folded part of the bag in contact with the other part of the bag by means of a hook, a little glue or the like. When the bag is folded as explained, the volatile substance 7 does not evaporate or evaporates hardly at all. The bag is sold in this folded state.

When it is desired to use the volatile substance, it is sufficient to unfold the folded end of the bag and to hang the bag (Fig. 3) through the eye 6; under such conditions, the cake 7 falls towards the end 4 of the bag and comes in front of the perforations 5. The cake 7 can thus evaporate regularly and its emanations diffuse outwardly through the perforations 5.

Obviously the line of fold 8 might be at a slightly different place. Also the perforations 5 are not necessarily provided along a single line. Several such lines may be provided at different heights on the bag and the folding of the end of the bag may be effected through several folds so as to cover in succession the different lines of perforations. Thus for instance the bag may allow varying degrees of evaporation according as to whether it is unfolded partly with a single line of uncovered perforations or completely with several uncovered lines of perforations, whereby an adjustment of the rate of evaporation of the volatile substance is rendered possible.

Of course the perforations are not of necessity in alinement. Similarly the solid volatile substance is not necessarily constituted by a cake. It is sufficient that the fragmentary portions thereof are large enough to prevent their passing through the perforations.

What I claim is:

1. A scent bag for containing solid volatil substances and allowing the emanation thereof to be kept inside while stored and exhaled outside while in use without said substance being taken out of said bag; constituted by a bag of airtight and foldable matter, a solid volatil inside said bag the width of which is sufficient to allow said solid substance to slide easily therein, means for closing airtightly said bag after introduction of the solid volatil substance, a plurality of perforations small enough to prevent the solid substance to escape therethrough, the length of the bag and position of the perforations being such that the solid substance when at one end of the bag be entirely contained in the unperforated part of the bag, and that the part of said bag between the other end thereof and the perforations be large enough for covering said perforations when folded thereon, means for keeping said part folded and to unfold it at will; at the first mentioned end of the bag means for hanging it.

2. A scent bag according to claim 1 for keeping the solid volatil substance and preventing the emanation thereof to be exhaled outside; said substance lying at the first mentioned end of the bag and the other end being folded in such a manner that it covers and closes airtightly the perforations.

3. A scent bag according to claim 1 for allowing the emanation of the solid volatil substance to be exhaled outside, the bag being hung by the means provided therefor at the first mentioned end thereof, the other end being unfolded and the solid volatil substance having slid and come into the perforated part of the bag.

EMILE ARMAND GILOT.